(12) United States Patent
Moffett et al.

(10) Patent No.: US 8,388,832 B2
(45) Date of Patent: Mar. 5, 2013

(54) PROCESS FOR FLOCCULATION OF A TAILINGS STREAM

(75) Inventors: Robert Harvey Moffett, Landenberg, PA (US); Peter Andrin, Napanee (CA)

(73) Assignee: E. I. du Pont de Nemours and Company, Wilmington, DE (US)

(*) Notice: Subject to any disclaimer, the term of this patent is extended or adjusted under 35 U.S.C. 154(b) by 652 days.

(21) Appl. No.: 12/608,142

(22) Filed: Oct. 29, 2009

(65) Prior Publication Data

US 2010/0126910 A1    May 27, 2010

Related U.S. Application Data

(60) Provisional application No. 61/109,286, filed on Oct. 29, 2008.

(51) Int. Cl.
*C10G 1/04* (2006.01)
*B01D 21/01* (2006.01)

(52) U.S. Cl. ......... 208/390; 208/391; 210/723; 210/726
(58) Field of Classification Search .................. 208/390, 208/391; 210/702, 723, 726
See application file for complete search history.

(56) References Cited

U.S. PATENT DOCUMENTS

| 3,951,800 A | * | 4/1976 | Ashton et al. ................. 210/702 |
| 5,368,745 A | * | 11/1994 | Rothenberg et al. .......... 210/734 |
| 6,203,711 B1 | * | 3/2001 | Moffett ......................... 210/725 |

* cited by examiner

*Primary Examiner* — Walter D Griffin
*Assistant Examiner* — Renee E Robinson
(74) *Attorney, Agent, or Firm* — Erik W. Perez

(57) ABSTRACT

A process for the treatment of a tailings stream is provided. The tailings stream comprises water, sand and clay fines and is produced from bitumen extraction process of an oil sands ore. The process for treating the tailings stream comprises contacting a polysilicate microgel, a polyacrylamide and one or both of a multivalent metal compound and a low molecular weight cationic organic polymer with a tailings stream to flocculate sand and clay fines.

13 Claims, 1 Drawing Sheet

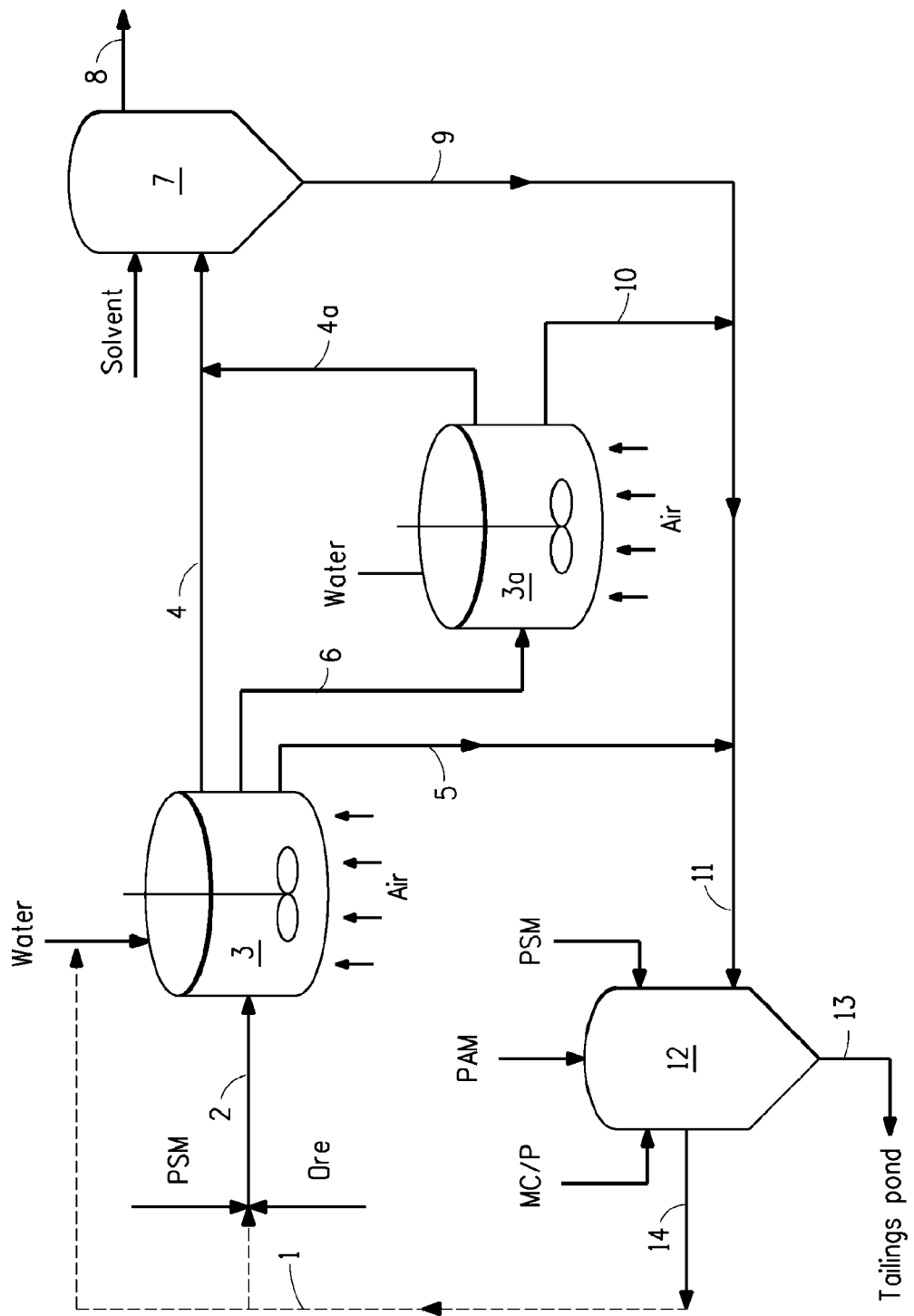

PROCESS FOR FLOCCULATION OF A TAILINGS STREAM

FIELD OF THE INVENTION

The present invention relates to a process for extraction of bitumen from oil sands and flocculation/dewatering of tailings after extraction.

BACKGROUND OF THE INVENTION

Oil sands have become an attractive source of oil recovery to support global demand for oil. Oil sands are large deposits of naturally occurring mixtures of bitumen, water, sand, clays, and other inorganic materials found on the earth's surface. Bitumen is a highly viscous form of crude oil. The largest oil sands deposits are found in Canada and Venezuela. In particular, the Athabasca oil sands deposit is equivalent to 1.6 to 2.7 trillion barrels of oil, and is located in the Canadian provinces of Alberta and Saskatchewan. About 10% of the Athabasca oil sands deposit can be mined. Once the oil sands are mined, it is processed by extracting the bitumen.

The bitumen must be extracted and separated from the water, sand and fine clays of the oil sands. Today, the oil sands are mined, crushed, then mixed with hot water, and optionally chemicals, to facilitate extracting the bitumen from the sand and clay fines. The extracted bitumen is separated from the sands and fine clays and is then refined. The remaining sand, fine clays and water, commonly referred to as "tailings", are further processed to dewater the sand and fine clays. The sand and clay fines are typically disposed, e.g., in a tailings pond and settle to become mature fine tailings. Mature fine tailings are a stable slurry comprising clay, fine sands, water and bitumen. Mature fine tailings have no strength, no vegetative potential and can be toxic to animal life, so must be confined and prevented from contaminating water supplies. The recovered water from the dewatering step may be re-used in the extraction process. Faster recovery of the water reduces heat energy requirements when this water is recycled for use in the extraction process.

The recovered bitumen from this process is in the form of a froth. The froth comprises a concentrated bitumen (typically 50% or greater), water, fine sand and clays. The froth is treated in a froth treatment unit, which may use steam (to de-aerate the froth) and a naphthenic or paraffinic solvent to recover a bitumen with greater than 95% purity. A byproduct of the froth treatment process is a froth treatment tailings. The froth treatment tailings comprise water, residual solvent, and fine solids that are primarily smaller than 44 micrometers in size. The froth treatment tailings are typically disposed of in a tailings pond. Froth treatment tailings contribute to mature fine tailings formation.

Tipman et al., in U.S. Pat. No. 5,876,592, disclose recovery of bitumen from oil sands in a process comprising adding aqueous caustic to an oil sands slurry, to create an emulsion. The emulsion is allowed to separate into 3 layers, with a top layer of a first froth comprising bitumen, bottom layer, referred to as tailings, comprising water, sand and clay fines that settled, and a middle layer, referred to as middlings, comprising residual bitumen, suspended clay fines and water. The middlings are further processed to recover additional bitumen in the same manner as the oil sands slurry, producing a second froth. The second froth may be combined with the first froth to recover bitumen by dilution with a solvent and removal of sand and clay fines.

Yuan, et al., *Canadian Metallurgical Quarterly*, 2007, vol. 46, no. 3 pp. 265-272, disclose using a multiple-step process, in a particular sequence, for removing sands and fine clays from tailings. The first step is referred to as flocculation-coagulation-flocculation (FCF), in which a flocculant is added. This allows for the flocculation of larger particles leaving fines in solution. In the second step, a coagulant is added. The coagulant destabilizes the fines causing small flocs to form. In the third step, a small amount of flocculant is added to combine the larger flocs from the first step with the smaller flocs in the second step, resulting in even larger flocs and an increase of settling rates, allowing for faster dewatering.

Acidified silicate has been used to enhance bitumen extraction by Masliyah, et al., *Ind. Eng. Chem. Res.*, 2005, vol. 44, pp. 4753-4761. By acidifying the silicates, divalent metal ions can be sequestered allowing for improved bitumen liberation while maintaining consistent pH. There is a similar disadvantage with this process as found in WO 2005/028592, that is, solids are dispersed.

Li, et al., *Energy & Fuels*, 2005, vol. 19, pp. 936-943 disclose the effect of a hydrolyzed polyacrylamide (HPAM) on bitumen extraction and tailings treatment of oil sands ores. Careful control of HPAM dosage is necessary to achieve efficiency in both bitumen extraction and in flocculation of solid fines.

Separation of bitumen from sand and clay fines, as well as dewatering of the sand and clay fines for disposal, are especially difficult for so-called "poor quality ores." Generally, a poor quality ore, in reference to an oil sands ore is an oil sands ore that contains a large amount of fines that hinder, not only extraction of bitumen, but also the dewatering process of sand and clay fines. Poor quality ores are difficult to extract bitumen from at acceptable yields using conventional methods. In addition, more bitumen is retained in the tailings streams from extraction of poor quality ores, which is sent to the tailings pond as a yield loss.

Poor quality ores reduce yield by as much as 35 to 50% and are avoided when possible. Alternatively, poor quality ores are blended in limited quantities with good quality ores so they can be processed more effectively. With demand for oil increasing every year, there is a need to mine these poor quality ores and to produce high yield of bitumen. The tailings should be essentially free of bitumen and separated from water, so the water can be re-used and the solids can be returned to the environment free of bitumen, within environmental limits.

There is a desire to have lower extraction temperatures (for example, less than about 50° C.) to save heat energy. For example, when an adjacent upgrading facility to treat the extracted bitumen is not available, there is added cost to supply heat energy for the extraction water.

While there have been many advances in the oil sands extraction and tailings, there remains a need to improve bitumen recovery (yield) from oil sands, improve de-watering of the tailings (i.e., less water in the tailings) and reduce need to add fresh water bitumen recovery processes. There is also a need to improve bitumen extraction in poor quality ores, and to do so without significant capital equipment, without significant bitumen yield loss. The present invention meets these needs.

SUMMARY OF THE INVENTION

The present invention is a process for the extraction/recovery of bitumen from oil sands and for the treatment of tailings. In one embodiment of this invention, the process comprises (a) providing an aqueous slurry of an oil sands ore and (b) contacting the slurry with a polysilicate microgel to produce a froth comprising bitumen and a tailings stream comprising sand and clay fines. Preferably, the process further comprises (c) dewatering the tailings. Bitumen is recovered from the froth. Optionally, an anionic polyacrylamide and/or caustic, such as sodium hydroxide, sodium silicate, sodium citrate, may be added after step (b) and prior to step (c). Alternatively, a polyacrylamide and one or both of (i) a multivalent metal compound and (ii) a low molecular weight cationic organic polymer may be added after step (b) and before step (c). Surprisingly, the process improves recovery of bitumen and does not adversely affect flocculation of tailings as compared to use of sodium silicate instead of polysilicate microgel. The polysilicate microgel is carried through to a dewatering step and may enhance flocculation in said tailings.

In an alternative embodiment of this invention, there is a process for treating a tailings stream comprising water, sand and clay fines to flocculate the sand and clay fines wherein the process comprises (a) contacting a polysilicate microgel, an anionic polyacrylamide and one or both of (i) a multivalent metal compound and (ii) a low molecular weight cationic organic polymer with the tailings stream to produce a flocculated solid, and (b) separating the flocculated solid from the stream. Unexpectedly and advantageously, in this second embodiment, flocculation is enhanced compared to use of polyacrylamide alone.

BRIEF DESCRIPTION OF THE FIGURE

FIG. 1 is a process flow diagram of a bitumen extraction process and tailings flocculation in accordance with this invention.

DETAILED DESCRIPTION OF THE INVENTION

In a first embodiment of this invention, there is provided a process for the recovery of bitumen from oil sands which comprises providing an aqueous slurry of an oil sands ore and contacting the slurry with a polysilicate microgel to improve bitumen separation, producing a froth and a tailings. A slurry of an oil sands ore may be produced by mining an oil sands ore, crushing the ore and adding water to produce a slurry. Optionally, an anionic polyacrylamide and/or caustic, such as sodium hydroxide, sodium silicate and sodium citrate, may be added to the combination of oil sands ore and microgel. The froth comprises bitumen, clay fines and water. The tailings comprise sand, clay fines, unreacted polysilicate microgel and water. Preferably the process further comprises dewatering the tailings. The polysilicate microgel in the tailings may be carried through with the water to a dewatering step, wherein the microgel may enhance flocculation in the tailings.

In an alternative embodiment, there is provided a process for the flocculation of a tailings stream wherein the tailings stream is produced from an oil sands ore and comprises water, sand and clay fines. This process comprises contacting the tailings stream with a polysilicate microgel, an anionic polyacrylamide and one or both of a multivalent metal compound and low molecular weight cationic organic polymer to flocculate the solids.

Oil Sands Ore

Oil sands ores are large deposits of naturally-occurring mixtures comprising bitumen, sand, clays, and other inorganic materials. Herein, bitumen refers to hydrocarbons and other oils found in oil sands, tar sands, crude oil and other petroleum sources. The oil sands ores used in this invention are mined materials and typically comprise about 5 to 15 wt % bitumen. The oil sands ores further comprise water, sand and clay fines. Generally the oil sands ores comprise about 2 to 5 wt % water. Inorganic material can be naturally-occurring ores, such as titanium ores and zirconium ores that are present in the oil sands ore.

The process of this invention may be used advantageously to treat poor quality ores. The "poorer" the quality of the oil sands ore, the higher the level of clay fines. Surprisingly, the process of this invention is effective at extracting bitumen from poor quality oil sands ores, while effectively dewatering the tailings streams.

Poor quality ores are defined herein as an oil sands ore which has one or more of the following properties: (a) levels of clay fines of greater than 15%; (b) montmorillonite clay in an amount greater than 1 wt % of the total weight of the oil sands ore, (c) greater than 10 ppm of calcium, magnesium; and (d) ores less than 25 meters from the earth's surface that have been subject to oxidation.

Polysilicate Microgel

The process of this invention comprises contacting a polysilicate microgel with an oil sands ore. Polysilicate microgels are aqueous solutions which are formed by the partial gelation of an alkali metal silicate or a polysilicate, such as sodium polysilicate. The microgels, which can be referred to as "active" silica, in contrast to commercial colloidal silica, comprise solutions of from 1 to 2 nm diameter linked silica particles which typically have a surface area of at least about 750 m$^2$/g. Polysilicate microgels are commercially available from E. I. du Pont de Nemours and Company, Wilmington, Del.

Polysilicate microgels have $SiO_2$:$Na_2O$ mole ratios of 4:1 to about 25:1, and are discussed on pages 174-176 and 225-234 of "The Chemistry of Silica" by Ralph K. Iler, published by John Wiley and Sons, N.Y., 1979. General methods for preparing polysilicate microgels are described in U.S. Pat. No. 4,954,220, the teachings of which are incorporated herein by reference.

Polysilicate microgels include microgels that have been modified by the incorporation of alumina into their structure. Such alumina-modified polysilicate microgels are referred as polyaluminosilicate microgels and are readily produced by a modification of the basic method for polysilicate microgels. General methods for preparing polyaluminosilicate microgels are described in U.S. Pat. No. 4,927,498, the teachings of which are incorporated herein by reference.

Polysilicic acid is a form of a polysilicate microgel and generally refers to those silicic acids that have been formed and partially polymerized in the pH range 1-4 and comprise silica particles generally smaller than 4 nm diameter, which thereafter polymerize into chains and three-dimensional networks. Polysilicic acid can be prepared, for example, in accordance with the methods disclosed in U.S. Pat. No. 5,127,994, incorporated herein by reference.

In addition to the above-described silica microgels, the term "polysilicate microgels" as used herein, includes silica sols having a low S value, such as an S value of less than 50%. "Low S-value silica sols" are described in European patents EP 491879 and EP 502089. EP 491879 describes a silica sol having an S value in the range of 8 to 45% wherein the silica particles have a specific surface area of 750 to 1000 m$^2$/g, which have been surface modified with 2 to 25% alumina. EP 502089 describes a silica sol having a molar ratio of $SiO_2$ to $M_2O$, wherein M is an alkali metal ion and/or an ammonium ion of 6:1 to 12:1 and containing silica particles having a specific surface area of 700 to 1200 m$^2$/g.

Polyacrylamide

Polyacrylamides (PAMs) useful in the present invention include anionic, cationic, non-ionic and amphoteric polyacrylamides. Polyacrylamides are polymers formed by polymerization of acrylamide, $CH_2=CHC(O)NH_2$. Polyacrylamides of the present invention typically have a molecular weight greater than one million.

Preferably the PAM is an anionic polyacrylamide (APAM) or cationic polyacrylamide (CPAM), more preferably APAM. APAM and CPAM are the generic names for a group of very high molecular weight macromolecules produced by the free-radical polymerization of acrylamide and an anionically or a cationically charged co-monomer. APAM and CPAM can be prepared by techniques known to those skilled in the art, including but not limited to the Mannich reaction. Both the charge density (ionicity) and the molecular weight can be varied in APAM and CPAM. By varying the acrylamide/ionic monomer ratio, a charge density from 0 (nonionic) to 100% along the polymer chain can be obtained. The molecular weight is determined by the type and concentration of the reaction initiator and the reaction parameters.

Low Molecular Weight Cationic Organic Polymers

Low molecular weight cationic organic polymers which can be used in this invention have a number average molecular weight less than 1,000,000. Preferably, the molecular weight is in the range between about 2,000 to about 500,000, more preferably between 10,000 and 500,000. The low molecular weight polymer is typically selected from the group consisting of polyethylene imine, polyamine, polycyandiamide formaldehyde polymer, diallyl dimethyl ammonium chloride polymer, diallylaminoalkyl (meth)acrylate polymer, dialkylaminoalkyl (meth)acrylamide polymer, a copolymer of acrylamide and diallyl dimethyl ammonium chloride, a copolymer of acrylamide and diallylaminoalkyl (meth)acrylate, a copolymer of acrylamide and dialkyldiaminoalkyl (meth)acrylamide, and a copolymer of dimethylamine and epichlorohydrin. Such polymers are described, for example, in U.S. Pat. Nos. 4,795,531 and 5,126,014. Low molecular weight cationic organic polymers are commercially available, for example, from SNF Floerger, Andrézieux, France as FLOQUAT FL 2250 and FLOQUAT FL 2449 and from FCT-Water Treatment, Greeley, Colo. as WT-530.

Multivalent Metal Compounds

Multivalent metal compounds useful in the present inventive process are compounds of metals with more than one valence state. Examples of multivalent metals include calcium, magnesium, aluminum, iron, titanium, zirconium and combinations thereof. Preferably, the multivalent metal compound is soluble in water and is used as an aqueous solution. Examples of suitable multivalent metal compounds include calcium chloride, calcium sulfate, calcium hydroxide, aluminum sulfate, magnesium sulfate, and aluminum chloride, polyaluminum chloride, polyaluminum sulfate, and aluminum chlorohydrate. Preferably the multivalent metal compound is calcium sulfate, aluminum sulfate, polyaluminum sulfate, polyaluminum chloride, or aluminum chlorohydrate. Compounds of multivalent metals that are polymerized are especially useful in the present invention.

Extraction and Flocculation

Oil sands ores are generally mined from the earth and processed to remove the bitumen, which can then be further treated as a crude oil. In a first embodiment, an oil sands ore is provided. The oil sands ore is mined from an oil sand deposit and crushed to provide a material suitable for extracting bitumen from the ore. Conventional methods can be used for mining and crushing. The oil sands ore is generally processed as an aqueous slurry. Recycled water from downstream dewatering step vida infra may be used to prepare the oil sands ore aqueous slurry.

The process of this invention comprises providing an aqueous slurry of an oil sands ore and contacting the slurry with a polysilicate microgel to extract bitumen from the oil sands ore. Water and optionally air may be added to the slurry prior to or during this contacting (extraction) step at a temperature in the range of 25 to 90° C. (77 to 194° F.), preferably at a temperature of 35 to 85° C. (95 to 185° F.). Advantageously the contacting step is performed at a temperature of 50° C. or less, for example, 35-50° C. (95-122° F.).

The amounts of the slurry components can vary. An aqueous slurry of an oil sands ore can be prepared by contacting an oil sands ore with water in an amount of 10% to 500%, based on the mass of the ore, preferably, 50% to 200%. The water may be recycled water from the extraction process. The amount of water added may be determined by extraction efficiency and by limitations of transfer lines used to convey the ore-containing slurry effectively through an extraction unit operation.

The polysilicate microgel is typically added in an amount of 25 to 5000 g per metric ton of the oil sands ore.

One or more of the following additives may be added to the oil sands ore slurry prior to contacting with the polysilicate microgel (extraction step (b)): anionic polyacrylamide and other polymeric flocculants and coagulants; caustics such as sodium hydroxide, sodium silicate, and sodium citrate; organic acids and salts of organic acids, such as glycolic acid and sodium glycolate, surfactants, buffers such as bicarbonates, and antimicrobial agents.

In the extraction step (b), the oil sands ore, microgel and water are mixed and optionally contacted with air, generally in the form of air bubbles, in a reaction vessel or in a transport line. Contact of the air bubbles with the slurry results in bitumen floating to the top of the slurry, creating a top layer, referred to as a froth, or a first froth, if multiple froths are produced in the process. The (first) froth comprises bitumen that has floated to the top of the slurry, and also comprises clay fines.

After forming a froth, the remainder of the slurry is permitted to separate in the reaction vessel or is transferred from a transport line to a separating vessel. The majority of the sand and clay fines settle to the bottom of the slurry forming a bottom layer, referred to as a coarse tailings. A middle layer is also formed in the slurry. The middle layer is a diluted portion of the slurry comprising bitumen that did not float to the top and sand and clay fines that did not settle to the bottom, and is referred to as middlings.

The middlings may be removed from the middle of the reaction or separation vessel. The removed middlings may be further processed by contacting with air as air bubbles or passing through one or more air flotation cells, where air bubbles enhance separation of the bitumen droplets from the solids (sand and clay fines) and water of the middlings, producing a (second) froth. The second froth may be recovered e.g., from the air flotation cell(s), and may be combined with a first froth. Polysilicate microgel may be added at this process step, typically in an amount of 25 to 5000 g per metric ton of the oil sands ore. Alternatively, the second froth may be added to the slurry comprising the oil sands ore and water prior to treating the slurry to produce the first froth.

After forming the second froth, the remainder of the slurry is permitted to separate in the reaction vessel or is transferred to a separating vessel. The majority of the sand and clay fines settle to the bottom of the slurry forming a bottom layer, referred to as a fine tailings, which comprise less sand and more fines than coarse tailings. A middle layer may also form in the slurry. Both the middle and bottom layers may be combined and treated downstream in a dewatering step as fine tailings.

Optionally, the middle layer that is formed with the second froth is removed as a second middlings and further treated with air in the same manner as the (first) middlings, that is, treated with air to produce a third froth. The third froth may be combined with the first froth and second froth to recover bitumen. The third froth may added to the slurry comprising the oil sands ore and water prior to producing first froth, optionally being combined with the second froth. In still another alternative, the third froth may be combined with the middlings prior to contacting the middlings with air. A second fine tailings is also produced with the third froth.

Each successive formation of a froth removes more of the bitumen from the oil sands ore. Although producing only up to a third froth is described herein, successive froths (fourth, fifth, etc.) are contemplated within the scope of this invention.

The process may further comprise removing the froth from the top of the slurry in the extraction step(s) and transferring the froth to a froth treatment unit. In the froth treatment unit, the froth is contacted with a solvent to extract the bitumen from the froth and to concentrate the bitumen. Typically the solvent is selected from the group consisting of paraffinic $C_5$ to $C_8$ n-alkanes and naphthenic solvents. Naphthenic solvents are typically coker naphtha and hydrotreated naphtha having an end boiling point less than 125° C. A by-product from froth treatment unit is froth treatment tailings, which comprise very fine solids, hydrocarbons and water.

After treatment of the froth in the froth treatment unit, the concentrated bitumen product may be further processed to purify the bitumen.

The froth treatment tailings may be further treated in a dewatering step to remove water, which may be recycled in the process, from the solids which comprise clay fines and sand.

The process may further comprise dewatering tailings. The tailings can be one or more of any of the tailings streams produced in a process to extract bitumen from an oil sands ore. The tailings is one or more of the coarse tailings, fine tailings and froth treatment tailings. The tailings may be combined into a single tailings stream for dewatering or each tailings stream may be dewatered individually. Depending on the composition of the tailings stream, the additives may change, concentrations of additives may change, and the sequence of adding the additives may change. Such changes may be determined from experience with different tailings streams compositions.

The tailings stream comprises at least one of the coarse tailings, fine tailings and froth treatment tailings. This dewatering step comprises contacting the tailings stream with polyacrylamide and one or both of (i) a multivalent metal compound and (ii) a low molecular weight cationic organic polymer. The tailings stream may comprise polysilicate microgel from the extraction steps. Additional polysilicate microgel may be added as necessary. Polysilicate microgels enhance the flocculation of the sand and clay fines in the dewatering step by providing a better separation of solids from water and/or an increased rate of separation of the solids from water and/or permitting a range of operating conditions for the dewatering step which can be tolerated while still achieving a desired level of separation of solids from water within a desired period of time.

Dewatering may be accomplished by means known to those skilled in the art. Such means include use of thickeners, hydrocyclones and/or centrifuges, or by decantation and/or filtration. The dewatered solids should be handled in compliance with governmental regulations. The separated water may be recycled to the process ("recycled water"). For example, the recycled water may be added to crushed oil sands ore for bitumen extraction. Recycled water may also be added to the process at any point where water is added.

Conventionally fine tailings and froth treatment tailings have been difficult to dewater effectively. Both comprise clay fines and unextracted bitumen. Such tailings after dewatering, have been sent to tailings pond and after time become mature fine tailings. In the present invention, separation of solids from even the fine tailings and froth treatment tailings is improved.

In alternatives to the process of this invention, there is a process to extract bitumen from a slurry comprising bitumen wherein the process comprises providing a slurry comprising bitumen, wherein the slurry is a middlings, a fine tailings or a froth treatment tailings, contacting the slurry with a polysilicate microgel to extract bitumen from the slurry, and produce a froth comprising bitumen and tailings. Preferably the tailings are dewatered. The contacting, extracting and dewatering steps are performed as described hereinabove.

The processes of this invention can be used to treat poor quality ores. Alternatively, a higher percentage of poor quality ores may be blended with good quality ores in the extraction and dewatering processes of this invention.

In a second embodiment of this invention, there is provided a process for treating a tailings stream comprising sand, clay fines and water, which process comprises (a) contacting the tailings stream with a polysilicate microgel, an anionic polyacrylamide, and one or both of a multivalent metal compound and a low molecular weight cationic organic polymer to produce flocculated solids; and (b) separating the flocculated solids from the stream. The separating step may be by dewatering. In this process, the sand and clay fines are flocculated to produce flocculated solids. In the separating step, the flocculated solids are separated from the stream, e.g., by dewatering to provide the solids and a recovered water.

The tailings stream may be a coarse tailings, fine tailings, froth treatment tailings or a combination of two or more thereof. Processes to produce such tailings streams are described hereinabove, with the exception that, in this embodiment, no polysilicate microgel is added in the extraction process. Therefore, tailings streams applicable to this embodiment can be produced from conventional oil sands processes for bitumen extraction. For example, the tailings stream treated herein can be a slurry comprising clay fines recovered from an oil sands solvent recovery unit. Still further, as an alternative, the tailings stream may be a mature fine tailings that has been removed from a tailings pond.

In the separating step, the objective is to flocculate and dewater the solids, while enabling recovery of as much water as possible. Surprisingly in the present invention, a faster separation rate and more complete separation of the solids from the water has been achieved. Thus the present invention has an improved process efficiency relative to conventional processes for treating tailings streams.

Solids may be disposed of, sent to a tailings pond for additional settling or, when solids are a concentrated source of minerals, such as titanium and zirconium minerals, the solids may be used as a raw material or feed to produce for example, titanium and zirconium compounds for commercial products.

Order of addition of polysilicate microgel, anionic polyacrylamide and one or both of a multivalent metal compound and a low molecular weight cationic organic polymer may be varied to induce certain desired effects. For example, the multivalent metal compound and/or low molecular weight cationic organic polymer may be added first and then the polyacrylamide may be added to the tailings stream, that is, first add metal compound, then add polymer. In an alternative method, the following addition sequence is used: (1) a first polymer, which is a polyacrylamide, then (2) a multivalent metal compound and/or low molecular weight cationic organic polymer, then (3) a second polymer, which is a polyacrylamide, are added in that sequence to the tailings stream. The first and second polymer may be the same or different polymers. For example, both the first and second polymers may be polyacrylamide; however the first polymer is an anionic polyacrylamide and the second may be a cationic polyacrylamide. In either of the addition methods disclosed, polysilicate microgel may be added at any point. That is, the microgel may be added prior to or after addition of anionic polyacrylamide and multivalent metal compound and/or low molecular weight cationic organic polymer, that is, prior to or after additions of (1), (2) and (3).

Dewatering may be accomplished by means known to those skilled in the art to separate the solids from the process water. Such means include thickener, hydrocyclone, centrifuge, decanting, and filtration. The dewatered solids should be handled in compliance with governmental regulations.

It has been surprisingly found that polysilicate microgels enhance the flocculation of the sand and clay fines in the dewatering step of tailings produced in the extraction of bitumen from oil sand ores relative to known processes which use polyacrylamide alone and polyacrylamide in combination with metal salts. Specifically, in the processes of this invention, solids separate from water at faster rates than known processes. In addition, a higher percentage of water is recovered from the processes and the recovered water can be recycled to the process.

It is desirable to recycle water to oil sands ore extraction and recovery processes in order to minimize the need to use fresh water as make-up in the processes. The recycled water may be added to crushed oil sand ore to produce a slurry for bitumen extraction. Alternatively, if recovered water is in excess of what is needed for the process, the water may be returned to the environment if the water meets local standards.

Still further, relative to known processes which use sodium silicate, the addition of polysilicate microgel during the extraction steps, does not adversely affect the separating/dewatering step, that is, it has been reported that the presence of sodium silicate retards flocculation and separation of solids from the tailings streams. Surprisingly in this invention, the addition of polysilicate microgel does not have a similar effect as sodium silicate. Use of sodium silicate also reduces water volume that is recovered and slows the rate of separation of solids from water relative to use of polysilicate microgels.

The processes of the present invention are robust and can be used to achieve desired levels of bitumen extraction and water recovery from both good and poor quality ores. Furthermore, the present invention provides a simpler separation process overall, reducing equipment, for example, eliminating the need for mechanical separation equipment. Still further the processes of the present invention may be used to treat fine tailings, to recover bitumen from such tailings, and to provide a mineral source, reducing the need for settling ponds.

DETAILED DESCRIPTION OF THE DRAWING

FIG. 1 is a process flow diagram of a bitumen extraction process and process for tailings flocculation in accordance with this invention.

Polysilicate microgel (PSM) and crushed oil sands ore (Ore) are combined in pipeline 1 and transferred as feed 2 to mixing vessel 3. Water is added to mixing vessel 3, producing a slurry. Air is added to slurry in mixing vessel 3 to produce (1) first froth 4, which comprises bitumen and separates from the slurry to the top of mixing vessel 3; (2) coarse tailings 5, which comprises the majority of sand and clay fines from feed 2, and separates to the bottom of mixing vessel 3; and (3) middlings 6, which comprises bitumen, clay fines and sand, and is the middle layer in mixing vessel 3.

First froth 4 is transferred to froth treatment vessel 7. Solvent is added to treatment vessel 7 to extract bitumen 8 from first froth and also produce froth treatment tailings 9 in treatment vessel 7. Bitumen 8 is transferred from treatment vessel 7 for further processing. Froth treatment tailings 9 comprises water and clay fines, and is further treated with other tailings streams.

Middlings 6 are removed from the middle of mixing vessel 3 and transferred to second mixing vessel 3a. Water is added to second mixing vessel 3a. Air is added to second mixing vessel 3a to produce second froth 4a, which comprises bitumen, clay fines and water and separates from middlings 6 to the top of mixing vessel 3a, and fine tailings 10, which comprises sand, clay fines and water and separates to the lower part of mixing vessel 3a. Second froth 4a is combined with first froth 4 and transferred to froth treatment vessel 7.

Coarse tailings 5 comprising sand, clay fines and water are combined with froth treatment tailings 9 and fine tailings 10 to provide combined tailings stream 11 and transferred to separator 12.

Optionally, a metal compound and/or a low molecular weight cationic organic polymer (MC/P), polyacrylamide (PAM) and polysilicate microgel (PSM) are added to combined tailings stream in separator 12. Combined tailings stream 11 is allowed to settle in separator 12. Solids 13 comprising sand and clay fines are separated from water 14. Solids 13 are transferred to tailings pond. Water 14 may be recycled, such as by transferring to mixing vessel 3 for re-use.

EXAMPLES

All solutions were stirred at 250 rpm. All filtrations were performed by filtering through #41 filter paper available from Whatman Group, Florham Park, N.J. and a Bühner funnel under vacuum. All percentages are listed by weight, unless otherwise noted. The volume of liquid passing through the filter paper was recorded at 0.5, 1, 2, 3, 4, and 5 minutes. The calculated solids concentrations were calculated based on starting weight of solids divided by the starting weight of the sample, plus weight of chemical additions, less the weight of liquid passing through the filter.

Example 1

A clay fines slurry (2.5 g, 6.7% solids) retained from oil sands solvent recovery unit was added to a beaker. A 100 ppm (mg calcium per kg solution) as calcium sulfate solution (87.7 mL, 2.42 g $CaSO_4$ in 2.5 L water) was prepared and added to the beaker. Water (87.7 g) was also added to bring the clay solids concentration to 2% and the slurry was stirred. An aqueous 0.1% solution of SUPERFLOC 135 (3.75 mL, 0.1%, an anionic polyacrylamide commercially available from Cytec Industries, West Paterson, N.J.) was added to the slurry and the slurry was stirred. After 30 seconds, aqueous polysilicate microgel solution (2.5 mL, 1% $SiO_2$, commercially available from E. I. du Pont de Nemours and Company, Wilmington, Del.) was added to the slurry and the slurry was then stirred. After an additional 30 seconds, the stirring was stopped, and the beaker contents were filtered. The volume of the liquid passing through the filter paper was recorded and a solids concentration was calculated as described above. Calculated solids concentration results are in Table 1.

Comparative Example A

A clay fines slurry (2.5 g, 6.7% solids) retained from oil sands solvent recovery unit was added to a beaker. A 100 ppm (mg calcium per kg solution) calcium sulfate solution (87.7 mL) was prepared and added to the slurry in the beaker. Water (87.7 g) was also added to the beaker to bring the clay solids concentration in the slurry to 2% and the slurry was stirred. An aqueous 0.1% solution of SUPERFLOC 135 (3.75 mL, 0.1%) was added to the slurry and the slurry was stirred. After an additional 30 seconds, the stirring was stopped, and the beaker contents were filtered. The volume of the liquid passing through the filter paper was recorded and a solids concentration was calculated as described above. Calculated solids concentration results are in Table 1.

Comparative Example B

A clay fines slurry (2.5 g, 6.7% solids) retained from oil sands solvent recovery unit was added to a beaker. Water was added to the beaker to bring the clay solids concentration in the slurry to 2% and the slurry was stirred. An aqueous 0.1% solution of SUPERFLOC 135 (3.75 mL, 0.1%) was added to the slurry and the slurry was stirred. After an additional 30 seconds, the stirring was stopped, and the beaker contents were filtered. The volume of the liquid passing through the filter paper was recorded and a solids concentration was calculated as described above. Calculated solids concentration results are in Table 1.

TABLE 1

Calculated Solids Concentration (% by weight) vs. Time (minutes)

|  | 0.5 min | 1 min | 2 min | 3 min | 4 min | 5 min |
|---|---|---|---|---|---|---|
| Example 1 | 3.99 | 5.80 | 11.05 | 13.79 | 20.62 | 25.97 |
| Comp. Ex. A | 2.09 | 2.12 | 2.20 | 2.25 | 2.32 | 2.36 |
| Comp. Ex. B | 2.91 | 3.50 | 4.47 | 5.63 | 6.97 | 8.81 |

As can be seen in Table 1, the calculated solids concentration after dewatering the product of Example 1 which contained 100 ppm calcium, 15 ppm anionic polyacrylamide (APAM), and 100 ppm $SiO_2$ as polysilicate microgel was greater than the calculated solids after dewatering the product of Comparative Example A which contained 15 ppm APAM. The calculated solids concentration from Example 1 was also greater than the calculated solids after dewatering the product of Comparative Example B, which contained 100 ppm calcium as calcium sulfate and 15 ppm APAM. Greater calculated solids concentration indicates an improvement in dewatering efficiency.

Example 2

A clay fines slurry (2.5 g, 12.4% solids) retained from oil sands solvent recovery unit was added to a beaker. Water was added to the beaker to bring the clay solids concentration in the slurry to 2% by weight and the slurry was stirred. Aqueous polysilicate microgel solution (2.5 mL, 1% $SiO_2$) was added to the slurry in the beaker and the slurry was stirred. A 35% aluminum hydroxide sulfate solution (0.524 mL, 7.16% $Al_2O_3$, commercially available under the brand name PASS 100, from Cleartech Industries, Inc., Saskatoon, SK, Canada) was added to the slurry and the slurry was stirred. Sodium hydroxide (6.1 mL, 0.3 N) was then added to the slurry to raise the pH to 8.4. An aqueous 0.1% solution of SUPERFLOC 135 (3.75 mL) was added to the slurry and the slurry was stirred. After 15 seconds, the stirring was stopped, and the beaker contents were filtered. The volume of the liquid passing through the filter paper was recorded and a solids concentration was calculated as described above. Calculated solids concentration results are in Table 2.

Comparative Example C

A clay fines slurry (2.5 g, 12.4% solids) retained from oil sands solvent recovery unit was added to a beaker. Water was added to the beaker to bring the clay solids concentration in the slurry to 2% by weight and the slurry was stirred. A 35% aluminum hydroxide sulfate solution (0.524 mL, 7.16% $Al_2O_3$) was added to the slurry and the slurry was stirred. Sodium hydroxide (4.4 mL, 0.3 N) was then added to the slurry to raise the pH to 8.4. An aqueous 0.1% solution of SUPERFLOC 135 (3.75 mL) was added to the slurry and the slurry was stirred. After 15 seconds, the stirring was stopped, and the beaker contents were filtered. The volume of the liquid passing through the filter paper was recorded and a solids concentration was calculated as described above. Calculated solids concentration results are in Table 2.

TABLE 2

Calculated Solids Concentration (% by weight) vs. Time (minutes)

|  | 0.5 min | 1 min | 2 min | 3 min | 4 min | 5 min |
|---|---|---|---|---|---|---|
| Example 2 | 3.03 | 4.56 | 13.94 | 20.95 | 23.96 | 25.16 |
| Comp. Ex. C | 2.68 | 3.32 | 4.69 | 7.08 | 9.87 | 23.07 |

As can be seen in Table 2, the calculated solids concentration after dewatering of the product of Example 2, which contained 100 ppm $SiO_2$ as polysilicate microgel, 150 ppm $Al_2O_3$ as aluminum hydroxide sulfate, and 15 ppm anionic polyacrylamide (APAM), was greater than the calculated solids after dewatering the product of Comparative Example C which did not contain polysilicate microgel. Significantly, the rate of dewatering for the product of Example 2 was much faster than the rate of dewatering for the product in Comparative Example C.

Example 3

A clay fines slurry (2.5 g, 12.4% solids) retained from oil sands solvent recovery unit was added to a beaker. Water was added to the beaker to bring the clay solids concentration in the slurry to 2% by weight and the slurry was stirred. Aqueous polysilicate microgel solution (2.5 mL, 1% $SiO_2$) was added to the slurry and the slurry was stirred. Sodium hydroxide (0.3 mL, 0.3 N) was then added to the slurry to raise the pH to 8.4. An aqueous 0.1% SUPERFLOC 135 solution (1.25 mL) was added to the slurry and the slurry was stirred. A 35% aluminum hydroxide sulfate solution (0.035 mL, 7.16% $Al_2O_3$) was added to the slurry and the slurry was stirred. After 30 seconds, an aqueous 0.1% PERCOL 7651 solution (0.5 mL, a cationic polyacrylamide commercially available from Ciba Specialty Chemical Corp., Tarrytown, N.Y.) was added to the slurry and the slurry was stirred. After 15 seconds, the stirring was stopped, and the beaker contents were filtered. The volume of the liquid passing through the filter paper was recorded and a solids concentration was calculated as described above. Calculated solids concentration results are in Table 3.

Comparative Example D

A clay fines slurry (2.5 g, 12.4% solids) retained from oil sands solvent recovery unit was added to a beaker. Water was added to the beaker to bring the clay solids concentration in the slurry to 2% by weight and the slurry was stirred. An aqueous 0.1% SUPERFLOC 135 solution (1.25 mL) was added to the slurry and the slurry was stirred. A 35% aluminum hydroxide sulfate solution (0.035 mL, 7.16% $Al_2O_3$) was added to the slurry and the slurry was stirred. After 30 seconds, an aqueous 0.1% PERCOL 7651 solution (0.5 mL, a cationic polyacrylamide commercially available from Ciba Specialty Chemical Corp., Tarrytown, N.Y.) was added to the slurry and the slurry was stirred. After 15 seconds, the stirring was stopped, and the beaker contents were filtered. The volume of the liquid passing through the filter paper was recorded and a solids concentration was calculated as described above. Calculated solids concentration results are in Table 3.

TABLE 3

| Calculated Solids Concentration (% by weight) vs. Time (minutes) | | | | | |
|---|---|---|---|---|---|
| | 0.5 min | 1 min | 2 min | 3 min | 4 min | 5 min |
| Example 3 | 5.68 | 15.58 | 38.20 | 49.55 | 49.55 | 55.01 |
| Comp. Ex. D | 3.15 | 4.01 | 7.16 | 20.17 | 31.67 | 42.41 |

Example 3 and Comparative Example D are examples of flocculant-coagulant-flocculation dewatering processes. As can be seen in Table 3, the calculated solids concentration of the product of Example 3, which contained 100 ppm $SiO_2$ as polysilicate microgel, 5 ppm anionic polyacrylamide (APAM), 10 ppm $Al_2O_3$ as aluminum hydroxide sulfate, and 2 ppm cationic polyacrylamide (CPAM), was greater than the solids concentration of the product of Comparative Example D, which contained 5 ppm APAM, 10 ppm $Al_2O_3$ as aluminum hydroxide sulfate, and 2 ppm CPAM but did not contain polysilicate microgel.

Example 4

A clay fines slurry (2.5 g, 12.4% solids) retained from oil sands solvent recovery unit was added to a beaker. Water was added to the beaker to bring the clay solids concentration in the slurry to 2% by weight and the slurry was stirred. Aqueous polysilicate microgel solution (2.5 mL, 1% $SiO_2$) was added to the slurry and the slurry was stirred. An aqueous 5% aluminum chlorohydrate solution (1 mL, 5.85% $Al_2O_3$, commercially available from Gulbrandsen Chemicals, LaPorte, Tex.) was added to the slurry and the slurry was stirred. Sodium hydroxide (1.2 mL, 0.3 N) was then added to the slurry to raise the pH to 8.4. An aqueous 0.1% SUPERFLOC 135 solution (3.75 mL) was added to the slurry and the slurry was stirred. After 15 seconds, the stirring was stopped, and the beaker contents were filtered. The volume of the liquid passing through the filter paper was recorded and a solids concentration was calculated as described above. Calculated solids concentration results are in Table 4.

Comparative Example E

A clay fines slurry (2.5 g, 12.4% solids) retained from oil sands solvent recovery unit was added to a beaker. Water was added to the slurry in the beaker to bring the clay solids concentration to 2% by weight in the slurry and the slurry was stirred. Aqueous 2.85% sodium silicate solution (0.877 mL) was added to the slurry and the slurry was stirred. An aqueous 5% aluminum chlorohydrate solution (1 mL, 5.85% $Al_2O_3$) was added to the slurry and the slurry was stirred. Sodium hydroxide (1.2 mL, 0.3 N) was then added to the slurry to raise the pH to 8.4. An aqueous 0.1% SUPERFLOC 135 solution (3.75 mL) was added to the slurry and the slurry was stirred. After 15 seconds, the stirring was stopped, and the beaker contents were filtered. The volume of the liquid passing through the filter paper was recorded and a solids concentration was calculated as described above. Calculated solids concentration results are in Table 4.

TABLE 4

| Calculated Solids Concentration (% by weight) vs. Time (minutes) | | | | | |
|---|---|---|---|---|---|
| | 0.5 min | 1 min | 2 min | 3 min | 4 min | 5 min |
| Example 4 | 3.39 | 6.37 | 24.45 | 30.40 | 30.40 | 30.40 |
| Comp. Ex. E | 2.50 | 2.78 | 3.25 | 3.71 | 4.25 | 4.87 |

As can be seen in Table 4, the calculated solids concentration of the product of Example 4, which contained 100 ppm $SiO_2$ as polysilicate microgel, 117 ppm $Al_2O_3$ as aluminum chlorohydrate solution, and 15 ppm anionic polyacrylamide (APAM), was greater than the solids concentration of the product of Comparative Example E, which contained 100 ppm sodium silicate, 117 ppm $Al_2O_3$ as aluminum hydroxide sulfate and 15 ppm APAM.

Example 5

A clay fines slurry (2.5 g, 12.4% solids) retained from oil sands solvent recovery unit was added to a beaker. Water was added to the beaker to bring the clay solids concentration in the slurry to 2% by weight and the slurry was stirred. Aqueous polysilicate microgel solution (2.5 mL, 1% $SiO_2$) was added to the slurry and the slurry was stirred. Sodium hydroxide (0.3 mL, 0.5 N) was then added to the slurry to raise the pH to 8.4. An aqueous 0.1% SUPERFLOC 135 solution (1.25 mL) was added to the slurry and the slurry was stirred. An aqueous 1% Agefloc A50HV solution (1 mL, a low molecular weight polyamine coagulant commercially available from Ciba Specialty Chemical Corp., Tarrytown, N.Y.) was added to the slurry and the slurry was stirred. After 30 seconds, an aqueous 0.1% PERCOL 7650 solution (1.5 mL, a cationic polyacrylamide commercially available from Ciba Specialty Chemical Corp., Tarrytown, N.Y.) was added to the slurry and the slurry was stirred. After 15 seconds, the stirring was stopped, and the beaker contents were filtered. The volume of the liquid passing through the filter paper was recorded and a solids concentration was calculated as described above. Calculated solids concentration results are in Table 5.

Comparative Example F

A clay fines slurry (2.5 g, 12.4% solids) retained from oil sands solvent recovery unit was added to a beaker. Water was added to the beaker to bring the clay solids concentration in the slurry to 2% by weight and the slurry was stirred. Sodium hydroxide (0.1 mL, 0.5 N) was then added to the slurry to raise the pH to 8.4. An aqueous 0.1% SUPERFLOC 135 solution (1.25 mL) was added to the slurry and the slurry was stirred. An aqueous 1% Agefloc solution (1 mL) was added to the slurry and the slurry was stirred. After 30 seconds, an aqueous 0.1% PERCOL 7650 solution (1.5 mL, a cationic polyacrylamide commercially available from Ciba Specialty Chemical Corp., Tarrytown, N.Y.) was added to the slurry and the slurry was stirred. After 15 seconds, the stirring was stopped, and the beaker contents were filtered. The volume of the liquid passing through the filter paper was recorded and a solids concentration was calculated as described above. Calculated solids concentration results are in Table 5.

TABLE 5

Calculated Solids Concentration (% by weight) vs. Time (minutes)

| | 0.5 min | 1 min | 2 min | 3 min | 4 min | 5 min |
|---|---|---|---|---|---|---|
| Example 5 | 5.65 | 24.33 | 39.84 | 43.29 | 43.29 | 43.29 |
| Comp. Ex. F | 3.88 | 6.26 | 15.22 | 28.01 | 38.91 | 42.19 |

Example 5 and Comparative Example F are examples of flocculant-coagulant-flocculation dewatering processes. As can be seen in Table 5, the calculated solids concentration of the product of Example 5, which contained 100 ppm $SiO_2$ as polysilicate microgel, 5 ppm anionic polyacrylamide (APAM), 40 ppm low molecular weight coagulant, and 2 ppm cationic polyacrylamide (CPAM), was greater than the solids concentration of the product of Comparative Example F, which contained which 5 ppm anionic polyacrylamide (APAM), 40 ppm low molecular weight coagulant, and 2 ppm cationic polyacrylamide (CPAM), but did not contain polysilicate microgel. Significantly, the rate of dewatering for the product of Example 5 was much faster than the rate of dewatering for the product in Comparative Example F.

What is claimed is:

1. A process for treating a tailings stream which comprises sand, clay fines and water, the process comprising (a) contacting a polysilicate microgel, an anionic polyacrylamide and one or both of (i) a multivalent metal compound and (ii) a low molecular weight cationic organic polymer with the tailings stream to flocculate the sand and clay fines producing flocculated solids, and (b) separating the flocculated solids from the stream.

2. A process according to claim 1 wherein the tailings stream is a coarse tailings, a fine tailings or a froth treatment tailings produced in a process for extracting bitumen from an oil sands ore.

3. A process according to claim 1 wherein the multivalent metal compound and/or low molecular weight cationic organic polymer is added and then the anionic polyacrylamide is added to the tailings stream.

4. A process according to claim 1 wherein the addition sequence to the tailings stream is (1) a first polymer, which is the anionic polyacrylamide, then (2) a multivalent metal compound and/or low molecular weight cationic organic polymer, and then (3) a second polymer, which is a cationic or anionic polyacrylamide, wherein the polysilicate is added prior to or after additions (1), (2) or (3).

5. A process according to claim 4 wherein the first polymer is an anionic polyacrylamide and the second polymer is a cationic polyacrylamide.

6. A process according to claim 4 wherein polysilicate microgel is added after addition (1).

7. A process according to claim 4 wherein polysilicate microgel is added after addition (2).

8. A process according to claim 4 wherein polysilicate microgel is added after addition (3).

9. A process according to claim 1 wherein a multivalent metal compound is added in step (a) and the multivalent metal is calcium, magnesium, aluminum, iron, titanium, zirconium or a combination of two or more thereof.

10. A process according to claim 9 wherein the multivalent metal compound is calcium chloride, calcium sulfate, calcium hydroxide, aluminum sulfate, magnesium sulfate, aluminum chloride, polyaluminum chloride, polyaluminum sulfate, or aluminum chlorohydrate.

11. A process according to claim 10 wherein the multivalent metal compound is calcium sulfate, aluminum sulfate, polyaluminum sulfate, polyaluminum chloride, or aluminum chlorohydrate.

12. A process according to claim 1 wherein a low molecular weight cationic organic polymer is added in step (a) and the low molecular weight cationic organic polymer is selected from the group consisting of polyethylene imine, polyamines, polycyandiamide formaldehyde polymers, diallyl dimethyl ammonium chloride polymers, diallylaminoalkyl (meth) acrylate polymers, dialkylaminoalkyl (meth)acrylamide polymers, a copolymer of acrylamide and diallyl dimethyl ammonium chloride, a copolymer of acrylamide and diallylaminoalkyl (meth)acrylates, a copolymer of acrylamide and dialkyldiaminoalkyl (meth)acrylamide, and a copolymer of dimethylamine and epichlorohydrin.

13. A process according to claim 1 wherein separating is accomplished by using a thickener, hydrocyclone, or a centrifuge, or by decantation or filtration.

* * * * *